of Ser. No. 269,213, July 5, 1972,# United States Patent [19]

McClinton

[11] 4,031,282

[45] June 21, 1977

[54] SIMULATED TRADITIONAL SAND-FINISHED MASONRY

[75] Inventor: John L. McClinton, Hanover, Md.

[73] Assignee: The Burns & Russell Company, Baltimore, Md.

[22] Filed: July 1, 1975

[21] Appl. No.: 592,356

Related U.S. Application Data

[63] Continuation of Ser. No. 269,213, July 5, 1972, abandoned.

[52] U.S. Cl. .................................. 428/141; 52/515; 52/596; 427/369; 428/304; 428/405; 428/446; 428/454; 428/538; 428/482; 52/309.13; 52/309.17
[51] Int. Cl.² ...................... B32B 3/00; B05D 3/12
[58] Field of Search .......... 428/141, 480, 304, 538, 428/403, 405, 446, 454; 52/596, 515, 309; 427/369

[56] References Cited

UNITED STATES PATENTS

| 1,193,843 | 8/1916 | Symmes | 52/315 |
| 2,563,288 | 8/1951 | Steinman | 117/126 GS |
| 2,649,396 | 8/1953 | Witt et al. | 117/126 GS |
| 2,683,674 | 7/1954 | Hatcher et al. | 52/515 |
| 2,688,006 | 8/1954 | Steinman | 117/126 GS |
| 2,751,775 | 6/1956 | Sergovic | 52/309 |
| 2,752,275 | 6/1956 | Raskin et al. | 52/309 |
| 2,814,836 | 12/1957 | Russell | 52/309 |
| 2,951,001 | 8/1960 | Rubenstein | 52/309 |
| 2,951,006 | 8/1960 | Rubenstein | 52/309 |
| 3,042,535 | 7/1962 | Hiltrop et al. | 117/54 |
| 3,660,214 | 5/1972 | Nichols et al. | 52/309 |

OTHER PUBLICATIONS

Polyesters and their Applications, by Bjorksten Research Lab., Reinhold Pub. Corp., N.Y., 1956, pp. 90–96.

Primary Examiner—George F. Lesmes
Assistant Examiner—P. J. Thibodeau
Attorney, Agent, or Firm—Ronald A. Schapira

[57] ABSTRACT

Simulated traditional colonial sand-finished masonry is provided having a unique appearance simulating that of sand-finished burned clayware. The decorative qualities are excellent and can be made similar to those of architectural terra cotta and other burned clayware. The product of the invention comprises a substrate or panel which is coated with a cured plastic composition containing filler and having the desired appearance. The coated surface has a rough, rugged surface which is characteristic of sand finished masonry. The surface has the hardness of silica, is waterproof, decorative, and permanent; with the effect of clayware.

The simulated product of the invention is easily and inexpensively constructed. In accordance with one embodiment of the invention, a wall construction is provided of masonry blocks coated with a cured plastic-sand composition having suitable pigments to produce a sand finished masonry appearance.

24 Claims, 3 Drawing Figures

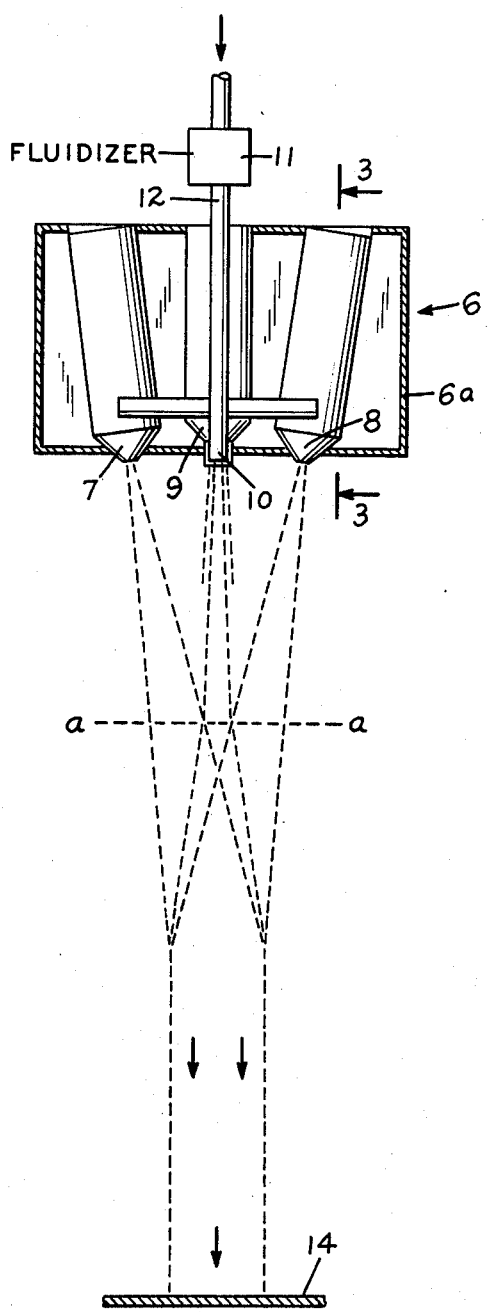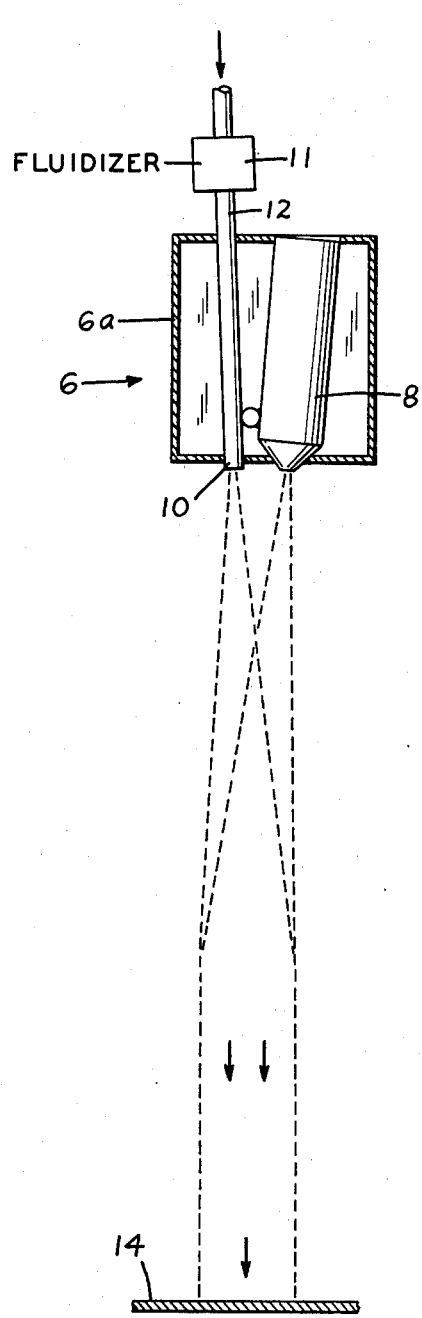

SIMULATED TRADITIONAL SAND-FINISHED MASONRY

This is a continuation of application Ser. No. 269,213, filed July 5, 1972 now abandoned.

BACKGROUND OF INVENTION

It has long been desired to provide panels and wall members having a simulated traditional colonial sand-finished masonry appearance. Such a finish has excellent decorative effects. In its proper form it has a rugged, roughened appearance which is unique. It has further been desired to provide panels and wall members with this finish or surface, which is extremely hard water-resistant, permanent and yet be easily and inexpensively produced.

Over the years, brick-wall construction has been the construction of choice in the building industry. It provides an excellent appearance, is relatively impervious to water and the ravages of weather and climate. It provides excellent thermal-insulating properties as well as durable construction. Brick-wall construction suffers from the disadvantage of being relatively expensive and time-consuming to produce. This disadvantage has become even more accentuated in recent years with the marked inflation in labor costs in the building trades. Indeed, the cost of brick-wall construction has now become so expensive, that its use is limited to preminum construction, such as banks and other buildings which can afford high costs.

Concrete block construction is relatively inexpensive, but it suffers from the disadvantages of being porous and lacking in the esthetic qualities, such as appearance, which makes brick-wall construction so advantageous. The building industry has long desired to have a wall construction which provides the excellent qualities and advantages of brick-wall construction while permitting relatively low costs of concrete block construction.

It is an object of the invention to provide a panel or wall construction comprised of a substrate having a facing on one or more surfaces of a resinous-filler composition to produce a decorative, serviceable surface thereon which simulates a traditional colonial sand finished masonry appearance.

It is an additional object of the invention to provide wall construction of building blocks having a facing of resinous-filler composition to produce a serviceable, rugged, rough, water-resistant surface which simulates a traditional colonial sand finished masonry appearance.

It is also an object of the invention to similate a traditional colonial sand finish masonry construction at little more than the cost of a block wall construction.

Another object of the invention is the provision of a panel or wall construction which has excellent surface properties of repelling water and moisture, while at the same time permitting the wall to "breathe" and permit diffusion of moisture from within to the exterior surface.

It is a further object of the invention to provide a wall construction which will not fade when exposed to weather and climatic conditions.

These and other objects of the invention will be better understood by reference to this description of the invention in connection with the accompanying drawings, in which:

FIG. 2 is a front view of the cluster of three nozzles of the spray-gun, plus the sand-ejecting nozzle, which has been found to be useful to apply and mix the masonry surface ingredients at the time of application to the substrate.

FIG. 3 is a side view of the nozzles of the spray gun shown in FIG. 2, this view being taken along line 3—3 of FIG. 2.

BRIEF SUMMARY OF INVENTION

Figure 1:
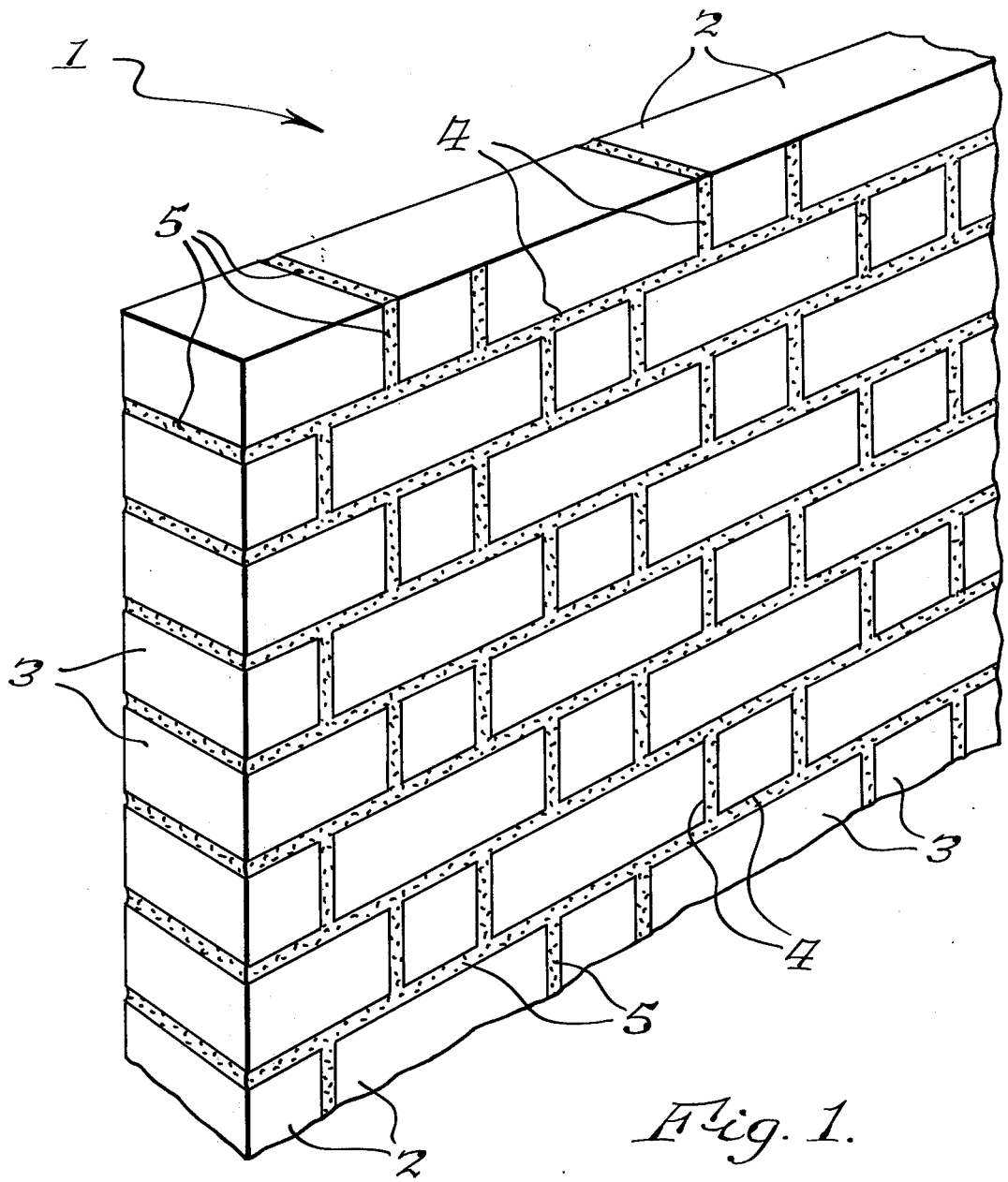
FIG. 1 is a perspective view of a wall construction in accordance with the present invention.

Referring to the broader aspects of the present invention, there is provided a novel panel or a wall construction comprised of concrete blocks, which panel or wall construction has a facing which simulates a traditional colonial sand finished masonry. The facing is of a cured composition comprising a thermosetting resin, such as an ethylenically unsaturated alkyd or polyester resin, a polyurethane resin, an epoxy resin, and the like, a polymerizable, vinyl monomer and at least about 50% by weight of silane-treated filler, such as sand. The coating composition is applied to the face of the masonry block with a trowel or preferably in terms if its components through a spray gun such as illustrated in FIGS. 2 and 3, and cures in a short period of time at ambient or room temperature, or optionally, facilitated and accelerated by application of heat. A catalyst composition is provided which permits curing at these temperatures. Pigments are selected which provide a colonial finish color and appearance to the surface of the product. Fading of the pigmented surface is prevented or reduced by incorporating an ultraviolet or actinic absorbent into the surface-forming composition.

The panel or wall construction of the invention possesses unique moisture repellent properties. While the exterior surface will repel seepage of water and moisture to within the wall construction, the surface of the wall permits the wall to "breathe" and will permit moisture contained within the building or the wall to diffuse from within to the outer surface of the wall.

The surface is applied to the substrate by spraying or pouring and then is troweled or pressure smeared to provide a surface, when the composition is cured, which is rough and rugged, as in traditional colonial masonry. This rough and rugged surface is unique and cannot be obtained in any molding or casting treatment. Indeed, molding and casting must be avoided.

Unique appearances can be imparted by mixing into the coating compositions decorative pigments, frits, and other particles. Thus reflecting granules and brightly colored granules can be used to impart unusual effects.

In accordance with one embodiment of the invention, concrete blocks are coated on at least one surface with the surface-forming compositions of the invention and the surface cured, and the wall is constructed by placing the blocks one upon the other. As shown in FIG. 1 of the accompanying drawings, the wall (1) is constructed of the individual concrete blocks (2), with their simulated colonial burned clay finish (3), and the joints or interstices (4) are mortared with the conventional mortar used in the building industry. If additional mortar joints are desired, the coated surface of the block can be cut away with a masonry saw and mortared as shown at (5).

However, other products, such as concrete panels or panels of other materials may be coated in accordance with the invention to provide the desired simulated surface.

DETAILED DESCRIPTION OF THE INVENTION

The building blocks or panels which may be employed in the invention are those made from cinders, slag, concrete, haydite, clay, sand, sandlime, gasbetone, gravel, or the like, or any lightweight or heavyweight block which uses cement as a binder. Additionally, any sturdy or wall material may be employed.

It has been found that spraying the components forming the surface composition onto the substrate provides excellent results and is economical and efficient. This manner of mixing the components at the time of contact with the substrate is achieved by means of a multi-nozzle gun such as the "Glas-Mate" gun produced by Ransburg Electro-Coating Corp. A gun of this type is shown in FIGS. 2 and 3 of the drawings.

As shown in FIGS. 2 and 3, the multi-nozzle arrangement has three converging nozzles which eject liquid comonents to converge just above the substrate. The gun 6, which optionally has a housing 6a, has nozzles 7 and 8, which eject the liquid resinous components of the coating composition, nozzle 9 ejects the organic solvent solution of the catalyst and nozzle 10 is a broad nozzle which ejects an air suspension of sand into the converging liquid components just above the substrate surface 14.

As shown in FIG. 2, and to some extent in FIG. 3, the liquid components begin to converge about 8 inches below the nozzles as shown at point "a" by a dotted line and this convergence is approximately 18 inches above the substrate surface 14. It is desirable that the sand mix with the converging liquid sprays just before reaching the mold pan. As will be apparent it is the convergence of the sprays which creats the uniform and excellent mixing of the components of the surface composition. It is not necessary to resort to thick slurries which have characterized the coating compositions of the prior art.

The sand is fluidized or transformed into an air suspension of sand in a "fluidizer" 11 which is commercially available for this purpose. The suspension is carried from the fluidizer as shown in FIGS. 2 and 3 to the nozzle 10 by means of tube 12. In the "fluidize,"air in a controlled amount is injected into a container holding the sand. Sand and air in controlled proportions are removed in measured amounts to be incorporated, as described, into the other components of the surface-forming composition.

After the surface-forming composition has been sprayed, as described above, on the substrate, the composition is then trowled, or otherwise pressure smeared, to provide a surface, when the composition has been cured, which is rough and rugged, as in traditional colonial products. Preferably, after troweling it is highly desirable to roll the troweled composition with a roller. Of course, the surface-forming composition can be applied in the form of a pre-mixed slurry to the substrate and troweled.

The unique rough surface of the present invention cannot be obtained by molding or casting techniques. The absence of molding or casting is essential in the present process. This not only provides saving in time and expense, but the desired attractive product is obtained.

It is not necessary that the facing be thick and facings in the order of 1/32 inch to about 1/16 are quite satisfactory and it is hardly ever necessary to exceed one-fourth inch.

The coating compositions employed include a thermosetting resin, a monomeric, vinyl polymerizable solvent for the thermosetting resin in cases where it is a polyester resin, which will not volatilize when the resin is cured, silane-treated sand as a filler, and the necessary pigment to impart a desired color of traditional colonial finishes to the coating composition.

As stated hereinabove, the thermosetting resin is preferably a polyester resin, a polyurethane resin or an epoxy resin. Other thermosetting rsins may, however, be employed.

The polyester resins which may be employed are substantially any of those described in Sergovic U.S. Pat. No. 2,751,775.

The polyester resins are a class of resins with which the resin chemist is familiar. These are ethylenically unsaturated alkyd resins. The preferred resins of this class for employment in the coating compositions of the invention are the polymeric ester reaction products of one or more dicarboxylic acids and one or more polyhydric alcohols. Desirably one or more of these reactants shall contain a reactive double bond or ethylenic linkage. Among the dicarboxylic acids which may be used is phthalic, malic, maleic, fumaric, adipic, pimelic, suberic, sebacic, itaconic, citraconic and succinic acids and their anhydrides. It is essential that some of the dicarboxylic acid component of the polyester resin contain an unsaturated ethylenic linkage. For this reason, maleic and fumaric acids are most desirable. Among the polyhydric alcohols which may be used are ethylene glycol, diethylene glycol and propylene glycol. A mixture of propylene glycol and dipropylene glycol is the most satisfactory polyhydric alcohol. One may use an unsaturated monohydric alcohol in place of part of the polyhydric alcohol. A typical example of such an alcohol is allyl alcohol which produces an allyl ester of the dicarboxylic acid. The polyester resins may be suitably modified or plasticized by the incorporation of alcohols, fatty acids, etc. to modify the chemical and physical characteristics as desired. The polyesters should comprise upward from about 40% and preferably 50% to 85% by weight of the total of the polyester and resin forming component, e.g., styrene, etc., of the coating composition.

The monomeric, vinyl polymerizable solvent should be one in which the polyester resin is soluble nd which assists in cross-linking the polyester resin during curing. The function of this solvent is to make the polyester resin more fluid and also to crosslink the polyester resin at the time of curing to produce a cross-linked, or three dimensional resin with the polyester resin, which is thermosetting in character. This monomeric solvent is an important member of the resin component, for it provides the necessary fluidity to the resin component, imparts thermosetting characteristics to the cured resin and is consumed during the curing of the resin without forming volatile materials.

Among the monomeric, vinyl polymerizable solvents which may be used are the following: styrene, methyl methacrylate, butyl methacrylate, vinyl toluene, e.g., o-vinyl toluene, p-vinyl toluene and m-vinyl toluene, cyclo-pentadiene; vinyl acetate; diallyl esters, e.g., diallyl phthalate and triallyl cyanurate, as well as alpha methyl styrene. Styrene and methyl methacrylate have produced the most satisfactory results thus far.

The epoxy resins are a well known class of thermosetting resins and the resins of this class suitable for use in the compositions of the present invention contain along with etheral oxygen, glycidyl groups in such quantity that the material has a 1,2-epoxy equivalency in the average molecule of greater than one.

The epoxy resins employed in the present invention are devoid of ethylenic unsaturation or similar polymerizable grouping. In general, the only functional groupings present are hydroxy, ether and epoxy groups. Thus, the epoxy resins are prepared from saturated polyhydric alcohols and phenols which contain no carbon to carbon unsaturation other than that which is present in the aromatic ring.

By the epoxy equivalency, reference is made to the average number of 1,2-epoxy groups.

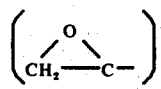

contained in the average molecule of the ether.

A preferred group of epoxy ethers for use in the inention is prepared by reacting a dihydric phenol with epichlorohydrin in alkaline solution. These products are of resinous character and frequently are solid materials at normal temperature (20°-30° C.). Any of the various dihydric phenols are used in preparing these glycidyl ethers, including mononuclear phenols like resorcinol, catechol, hydroquinone, etc., or polynuclear phenols like bis-(4-hydroxyphenyl)-2,2-propane (bis-phenol-A), 4,4'-dihyroxy benzophenone, bis-(4-hydroxyphenyl)-1,1-ethane, bis-(4-hydroxyphenyl)-1,1-isobutane, bis-(4-hydroxyphenyl)-2,2-butane, bis-(4-hydroxy-2-methylphenyl)-2,2-propane, bis-(2-dihydroxynaphthyl)-methane, 1,5-dihydroxy naphthalene, etc. The product may be represented by the formula:

wherein $n$ is an integer, preferably from 1 to 7, and R represents the divalent hydrocarbon radical of the dihydric phenol. The preferred epoxy ethers for use in the invention are those having epoxy values no less than 0.20 (Pyridinium Chloride Method), and melting points no greater than 80° C. (Durran's Mercury Method). The preferred phenol is bis-phenol A.

Less preferably, there can be used 1,2-epoxy-containing polyethers of polyhydric alcohols, such as polyglycidyl ethers thereof, like the diglycidyl ether of ethylene glycol, propylene glycol, trimethylene glycol, diethylene glycol, triethylene glycol, glycerol, dipropylene glycol and the like. Other typical ethers of this class include glycidyl ethers of polyhydric alcohols having a 1,2- epoxy equivalency greater than one, such as the polyglycidyl ethers of glycol, diglycerol erythritol, pentaglycerol, mannitol, sorbitol, and the like.

In general, the glycidyl ether resin will have an epoxy equivalency greater than 1 and less than 2. The epoxy equivalency may be defined as the number of epoxy groups per molecule in contrast to the epoxy value which is the number of epoxy groups in 100 grams of the resin.

Typical epoxy resins which can be employed are the Epon resins which are made from bis-phenol A and epichlorohydrin. The following table describes the properties of several of such resins.

| Epoxy Resin | Av. Mol. Wt. | M.P. °C. | Sp. Gr. |
|---|---|---|---|
| Epon 562 (glycerol-epichlorhydrin) | 300 | Liquid | 1.2304 |
| Epon 828 | 390 | 8–12 | 1.1676 |
| Epon 834 | 530 | 20–28 | 1.1648 |
| Epon 864 | 630 | 40–45 | 1.1881 |
| Epon 1001 | 1000 | 64–76 | 1.2041 |
| Epon 1004 | 1850 | 95–105 | 1.154 |

There may also be used epoxy resins such as Araldite 6010, viscosity 10,000–20,000 cps, at 22° C., and Araldite 6020, viscosity 20,000–40,000 cps. at 22° C. These Araldite resins are also made from bis-phenol A and epichlorohydrin.

Those epoxy resins which are liquid at room temperature can be employed directly in the guns while those which are solids should first be heated above their melting points. The epoxy resins can be used alone or in admixture with each other or with other resins.

In using the epoxy resins, a hardening agent is incorporated therewith. Upon the addition of the hardening agent, the composition begins to cure and harden even at ordinary temperature. A great variety of substances are now known to be hardening agents for the resin-forming ingredients of the composition such as alkalies like sodium or potassium hydroxide; alkali phenoxides like sodium phenoxides; carboxylic acids or anhydrides such as formic acid, oxalic or phthalic anhydride; Friedel-Crafts metal halides like aluminum chloride, zinc chloride, ferric chloride or boron trifluoride as well as complexes thereof with ethers, acid anhydrides, ketones, diazonium salts, etc., phosphoric acid and partial esters thereof including n-butyl orthophosphate, diethyl orthophosphate and hexaethyl tetraphosphate; and amino compound such as triethyl amine, ethylene diamine, diethyl amine, diethylene triamine, triethylene tetramine, m-phenylenediamine, 3-diethylaminopropylamine, pyridine, piperidine, dicyandiamide, melamine and the like. The hardening agent is added and mixed in with the composition in order to effect hardening. The amounts vary considerably depending upon the particular agent employed. For the alkalies or phenoxides, 2 to 4 percent is suitable. With phosphoric acid and esters thereof, good results are obtained with 1 to 10 percent added. The amino compounds are used in amounts of about 5 to 15 percent and the others involve addition of about 1 to 20 percent.

The amounts of catalyst or hardening agent are based on the epoxy resin by weight.

The urethane resins which may be employed as the thermosetting resin are well known to the polymer chemist. Any polyol which, when reacted with the polyisocyanate, produces a polyurethane, desirably rigid, may be employed. Among the preferred polyols are the polyether polyols, and especially the reaction products of alkylene oxides, preferably propylene oxides, with low-molecular-weight compounds having three or more hydroxyl groups, such as glycerol, 1,2,6-hexanetriol, trimethylolpropane, pentaerythritol, methylglycoside, sorbitol, sucrose, etc. Glycols such as polypropylene glycol, etc., may be employed especially if used together with a higher functional polyol or a polyisocyanate having a functionality of greater than two, i.e., having more than two isocyanate groups per molecule.

Instead of polyether polyols, there may be employed polyhydroxyl-terminated polyesters, preferably those derived at least in part from triols or higher. The polyester polyols are usually less advantageous than the polyether polyols because they are generally more expensive and more viscous.

Polyols are usually referred to in terms of their hydroxyl number. Polyols having a high hydroxyl number (above 300) are preferred, particularly if polyols other than simple, non-polymeric polyols are employed. Hydroxyl numbers which are between about 300 and 800 are most desirable. At the higher hydroxyl numbers, a more friable, but also a more dimensionally stable polyurethane results.

Among the additional polyols which may be employed with a polyisocyanate to produce the rigid polyurethanes are: polyethylene glycol having molecular weights not exceeding 400, diethylene glycol, triethylene glycol, dipropylene glycol, tripropylene glycol, 1,4-butanediol, hexanediol, neopentyl glycol, trimethylolethane, trimethylolphenol, glucose, degraded starches and celluloses, hydroxymethyl derivatives of the cyclohexanol, castor oil, hydroxy terminated polymers such as those derived from lactones, such as caprolactone. These may be employed alone, or preferably as the reaction products with an alkylene oxide, such as propylene oxide, or with a polybasic acid or its anhydride. Among the polybasic acids which may be used are phthalic acid, adipic acid, sebacic acid, dimerized linoleic acid, oxalic acid and chlorendic acid.

Any polyisocyanate may be employed which will give a polymer, preferably rigid, with a suitable polyol, but preferably any polyisocyanate which is a liquid at the temperature of reaction may be employed. Particularly useful is the widely used tolylene diisocyanate (TDI) sold commercially as the 80:20 mixture of 2,4:2,6 isomers, its crude grade, also p,p'-diphenyl methane diisocyanate (MDI) and its crude grade (PPI) and polymethylene polyphenyl isocyanate (a mixture sold under the tradename PAPI). Other polyisocyanates which can be employed are: dianisidine diisocyanate, xylylene diisocyanate, diphenyl sulfone diisocyanate, 4-chloro-1,3-phenylene-diisocyanate; 4-isopropyl-1,3-phenylene diisocyanate; 2,4-diisocyanatodiphenylether; 3,3-dimethyl-4,4-diisocyanatodiphenylmethane; mesitylene diisocyanate; 4,4'-diisocyanatodibenzyl; 1,5-naphthalene diisocyanate; 3,3'-bitolylene-4,4'-diisocyanate; triphenylmethane triisocyante, tritolylmethane triisocyanate, tetramethylene diisocyanate; hexamethylene diisocyanate; the diisocyanate derived from dimer acids; decamethylene diisocyanate, the reaction product of toluene diisocyanate with trimethylolpropane at an NCO/OH ratio of 2:1 (Mondur CB), etc.

The polyisocyanate is advantageously employed in slight stoichiometric excess over the polyol so as to provide excess isocyanate linkages for cross-linking with formation of biuret and allophanate linkages. However, typical isocyanate to organic hydroxyl group ratios are from 0.75 to 1.25. On a weight basis this represents a range of approximately 40 to 150 parts of polyisocyanate per 100 parts of polyol.

The use of catalysts to assist in the formation of the polyurethane is conventional and may be employed. Especially effective as a catalyst is N,N,N',N'-tetrakis(2-hydroxypropyl)-ethylenediamine (sold under the tradename Quadrol), since it is both catalytic, because of its amino groups, and reactive with the polyisocyanate, because of its hydroxyl groups. It acts, therefore, as a polyol, a catalyst and a crosslinking agent and since it becomes chemically incorporated into the polyurethane, it imparts no odor to the final product or taste to the smoke. Such amines as bis-(2-hydroxypropyl)-2-methyl-piperazine and diethanol amine behave similarly.

Silane-treated sand or other filler is employed as the important filler in the coating composition of the invention. It should comprise at least 50% by weight of the coating composition. "Sand" as employed herein is intended to be used in its ordinary sense and includes loose material comprising small but easily distinguishable grains resulting from the disintegration of rocks. The grains are usually of between one-sixteenth and two mm. in diameter. The sand employed is not limited to silica sand, but may include other types of sand or other fillers. Rounded sand particles will nest more closely together than will rough, irregular shaped particles. However, rough, irregular shaped sand particles, such as those obtained by grinding are thus extremely beneficial in enhancing the rugged appearance of the surface applied to the substrate.

Satisfactory results have been obtained when using sand filler having a maximum particle size of about a 20-mesh sieve.

It has been found that it is particularly desirable in the surface coating mixture to employ at least about 50% up to about 90% by weight of sand or other filler and preferably from 60% up to about 75%. In addition to sand, granules may be employed, such as ground bricks or other inorganic materials.

It is highly important that the sand or other filler employed in the coating composition first be treated with a small amount of an alkylene silane or siloxane, such as between about 0.01% to 2% by weight of sand, and preferably between about 0.05 and 0.15%. Amounts below 0.1% require that silane be applied to the sand at super-atmospheric pressures. Amounts below 0.01% may not provide satisfactory results, whereas amounts in excess of 2% are uneconomical since they produce no particular added advantage. The silane or siloxane may be used to treat the sand by simply contacting the sand with the silane, either in the vaporous phase or as a liquid, or in the form of a solution in a non-reactant solvent, such as, for example, a hydrocarbon liquid, such as benzene or toluene, or any other diluent which does not react with the reactant groups of the silane.

Among suitable alkylene silanes and siloxanes are those having at least one alkylene substituent and at least one substituent which will react with sand or hydroxyl groups present on the surface of sand. The preferred alkylene silanes and siloxanes are those having the formula:

$$R_xSiX_{(4-x)}$$

in which R is an unsaturated group, preferably an unsaturated hydrocarbon group, including dienyl, vinyl, chlorvinyl, bivinyl, allyl, methallyl, chlorallyl, and the like; X is a group which reacts with sand or moisture normally present in the surface of sand such as preferably chlorine or bromine, although it may be oxyaryl, oxyalkyl, amino, etc.; x is a whole number from 1 to 3. Examples of these compounds are:

allyl triethoxy silane
diallyl diethoxy silane
triallyl ethoxy silane
methallyl trichloro silane
trichloroallyl chloro silane
allylphenyl dichloro silane
allylethyl dichloro silane
allylmethyl diethoxy silane
diallylmethyl ethoxy silane
allyl trichloro silane
dimethylallyl diethoxy silane
vinyl trichloro silane
divinyl dichloro silane
trivinyl monochloro silane
vinyl triethoxy silane
methyl vinyl dichloro silane and the like.

The foregoing alkylene silane compounds are employed to treat the sand or other filler prior to its incorporation with the thermosetting resin, since addition of the silane directly to the resin does not provide the advantages and improvements made possible by the present invention.

A number of catalysts may be employed with polyester compositions, such as hydrogen peroxide, benzoyl peroxide and the like. However, I prefer to employ the faster acting catalysts, such as a combination of methyl ethyl ketone peroxide in conjunction with a metallic dryer, such as cobalt naphthenate, or a vanadium salt. The optimum concentration of methyl ethyl ketone peroxide is about 2% of the resin weight. The use of cobalt naphthenate or other metallic dryer is desirable in the proportions of about 1½% by weight of the resins.

It is desirable to incorporate a suspending agent into the resin mixture. The preferred suspending agents are the cation modified clays, such as are disclosed in U.S. Pat. No. 2,531,427 which issued on Nov. 28, 1950 to Ernest A. Hauser. These cation modified clays are essentially clays, such as bentonite, which normally possess cation exchanging properties and which have in place of the normal exchangeable cation an onium base. Such onium base derivatives of the clays are the ammonium, phosphonium, oxonium, sulfonium, arsonium, stibonium and telluronium derivatives. The ammonium base clays are preferred. Excellent results have been obtained by incorporating about 2% to 10%, and preferably 3% by weight of an organic derivative of magnesium montmorillonite or dimethyldioctadecylammonium bentonite per weight of the total coating composition. These particular onium base derivatives are supplied by the National Lead Company under the trade names "Bentone 38" and "Bentone 34," respectively. The employment of these cation modified clays imparts a suspending action upon the high percentage of inorganic filler and prevents it from settling out before the coating composition has undergone an additional curing and has begun to solidify. This provides homogeneous resin coating.

The coating composition may desirably employ amounts of a form of magnesium hydroxide, such as brucite, in an amount of between 3 and 50% by weight of the total coating composition. Magnesium hydroxide reduces the amount of smoke formed when the coating is subjected to conditions of combustion.

It is desirable to add additional ingredients to the coating composition to insure the production of a surface that is flame resistant. This property will not always be required, however, so that such additions are entirely optional. The addition of antimony trioxide and chlorinated paraffins even in a small amount is sufficient for this purpose, although other materials, such as tricresyl phosphate, may be used in place thereof.

The coating employed in the present invention is surprising in its translucency. In spite of the high sand or filler content, which gives to the naked eye the appearance of opacity, when the surface of the coating is examined under a microscope it is found that the coating is really quite translucent and constitutes grains of sand surrounded by thermoset resin. It has been found that in view of this surprising translucency, the tendency of pigments to fade and resins to degrade when exposed to weathering and climatic conditions, can be alleviated by incorporating an ultraviolet absorbent.

Thus an important component of the composition which is added to the thermosetting resin material is an actinic or ultraviolet absorbent. It has been discovered that excellent ultraviolet absorbence is obtained in the coatings of the present invention employing benzophenones, benzotriazoles, substituted acrylonitriles and monobenzoates as the ultraviolet absorbent. Among the ultraviolet absorbents which may be employed are 2,4-dihydroxy-benzophenone, 2-hydroxy-4-methoxy-benzophenone, 2-hydroxy-4-n-octoxy-benzophenone, 2(2'hydroxy-5-methylphenyl) benzotriazole, 2-ethyl-hexyl-2-cyano-3,3-diphenyl acrylate, ethyl-2-cyano-3,3-diphenyl acrylate and resorcinol monobenzoate. One particular desirable material is Cyasorb-5411 which is believed to be 2-(2-hydroxy-5-t-octylphenyl)-benzotriazole, supplied by American Cyanamid Company. The ultraviolet absorbent is employed in an amount of 0.05% and 0.3% by weight of total coating composition.

Suitable pigments are an important component of the coating composition since they are important in providing the desired color which matches the color of conventional bricks. Such pigments as iron oxide to achieve red or yellow colors, may be employed.

After the components of the surface forming composition have been applied to the substrate, as by spraying, as described hereinabove, or by applying a slurry of all components, the composition is troweled or otherwise smeared over the substrate. Since a room temperature catalyst is desirably employed, the surface coating will cure in a short time at ambient or room temperature. By elevating the temperature a more rapid cure will result.

Desirably, the thermosetting resin component shall comprise between about 5 to 15% by weight of total composition, the polymerizable vinyl monomer about 5 to 15%, the sand about 50 to 90%, pigment about 0.2 to 1%, titanium dioxide or zirconium oxide up to about 1%, antimony oxide up to about 1%, Chlorowax up to about 3%, and asbestine up to about 20%.

In order more clearly to disclose the nature of the present invention, specific examples illustrating the present invention will hereinafter be described. It should be understood, however, that this is done solely by way of example and is intended neither to delineate the scope of the invention nor limit the ambit of the appended claims. Parts are expressed in terms of parts by weight.

EXAMPLE 1

A liquid mix is prepared by mixing the following ingredients in the amounts set forth:

| Material | Amounts in Lbs. |
|---|---|
| Polyester (Resin AK-14 of Conchemco). (100% polyester composition believed to be a condensation product of propylene glycol and dipropylene glycol in a ratio of 1 to 3 with phthalic anhydride and maleic anhydride in a ratio of 3 to 2) | 52.50 |
| Styrene monomer | 37.75 |
| Titanium dioxide | 1.65 |
| Antimony trioxide | 0.625 |
| Chlorowax 70 (chlorinated paraffin $C_{24}H_{29}Cl_{21}$ mol wt. 1060) | 1.7 |
| Asbestine (fibrous magnesium silicate mesh size 325) | 5.23 |
| Cyasorb-5411 | 1.5 |
| Bentone 38 | 0.02 |
| Pigment - iron oxide | 4.0 |

100 lbs. of the foregoing mixture were mixed with 15 lbs. of styrene, containing 0.575 lbs. of cobalt naphthenate and sprayed from nozzles (7) and (8) of the gun of FIGS. 2 and 3 of the drawings. A mixture of 2.15 lbs. of methyl ethyl ketone peroxide, in 8.6 lbs. of Cellosolve acetate (acetate of ethylene glycol monoethyl ether) was sprayed from nozzle (9). About 400 lbs. of banding sand of approximately 100 mesh particle size, treated with 0.1% of its weight of vinyl trichlorosilane, were sprayed in the form of an air suspension from nozzle (10). The ingredients were sprayed onto building blocks of dimensions 4 in. × 16 in. on one side to a thickness of about one-sixteenth of an inch. The ingredients thus were mixed at the site of application to the blocks. The surface was then troweled by hand and the surface permitted to cure by standing at ambient temperature (at least 75° F.) overnight. The product is a concrete block with traditional colonial masonry appearance. A wall was then constructed of the coated blocks and the joints mortared with a conventional mortar composition as shown in FIG. 1. The resulting wall had an excellent appearance, closely simulating a colonial traditional sand finished masonry. It was durable and readily withstood weathering and climatic conditions.

The asbestine was employed because of its very fine particle size. In its place may be used zirconium oxide.

The titanium dioxide is employed to assist in pigmenting and to provide some small degree of opacity. It has been discovered that the addition of the ultraviolet absorbent prevents or retards the fading which would otherwise result.

EXAMPLE 2

A liquid mix is prepared by mixing the following ingredients in the amounts set forth:

| Material | Amounts in Lbs. |
|---|---|
| Polyester (Hooker Hetron resin 27205) (100% polyester composition believed to be a halogenated condensation resin of maleic anhydride; due to its halogen content eliminating any need for chlorowax) | 50 |
| Styrene monomer | 25 |
| Methyl methacrylate | 15.25 |
| Titanium dioxide | 2 |
| Antimony trioxide | 0.625 |
| Zirconium oxide | 5.23 |
| Cyasorb-5411 | 5.0 |

| Material | Amounts in Lbs. |
|---|---|
| Pigment - iron oxide | 4.0 |

100 lbs. of the foregoing mixture were mixed with 15 lbs. of styrene, 0.50 lbs. of vanadium salt promoter (Tencem of Mooney Chemical Co.), 2.15 lbs. of methyl ethyl ketone peroxide and 400 lbs. of banding sand of approximately 100 mesh particle size, treated with 0.1% of its weight of vinyl trichlorosilane.

The resulting mixture is then applied by means of a trowel, or spray followed by troweling, on the desired surface of building blocks of dimensions 4 in. × 16 in. on at least one side and the coating permitted to cure by standing at ambient temperature (at least 75° F.) overnight. A wall is then constructed of the coated blocks and the joints mortared with a conventional mortar composition. The resulting wall had an excellent appearance, closely resembling a traditional masonry wall in appearance. It was durable and readily withstood weathering and climatic conditions.

EXAMPLE 3

A liquid mix is prepared by mixing the following ingredients in the amounts set forth:

| Material | Amounts in Lbs. |
|---|---|
| Polyester (Resin AK-14 of Conchemco-as in Example 1 hereinabove) | 65 |
| Styrene monomer | 25 |
| Methyl methacrylate | 5 |
| Antimony trioxide | 0.6 |
| Chlorowax 70 (chlorinated paraffin $C_{24}H_{29}Cl_{21}$ mol wt. 1060) | 2 |
| Cyasorb-5411 | 1.5 |
| Pigment - iron oxide | 4.0 |

100 lbs. of the foregoing mixture were mixed with 15 lbs. of styrene, 0.0575 lbs. of cobalt naphthenate, 215 lbs. of methyl ethyl ketone peroxide and 400 lbs. of banding sand of approximately 100 mesh particle size, treated with 0.1% of its weight of vinyl trichlorosilane.

The resulting mixture is then applied by means of a spray and troweled and then rolled on the desired surface of concrete panel of dimensions 6 ft. × 10 ft. on one side and the coating permitted to cure by standing at ambient temperature (at least 75° F.) overnight. The resulting panel had an excellent appearance, closely resembling traditional sand finished masonry in appearance. It was durable and readily withstood weather and climatic conditions.

Other polymerization accelerators also may be employed in the foregoing examples, such as a 5% by weight solution of calcium Tencem and a 16% solution of zinc Neonap, both of Mooney Chemical.

In the foregoing examples, the polyester resin may be replaced by any of the epoxy resins described hereinabove. The polyeter resins may be replaced by any of the polyurethane resins described hereinabove.

Also, in the foregoing examples other vinyl silanes may be employed in place of the vinyl trichlorosilane, including those disclosed in the foregoing specification.

The terms and expressions which have been employed are used as terms of description and not limitation, and it is not intended in the use of such terms and expressions, of excluding any equivalents of the features shown and described or portions thereof, but it is recognized that various modifications are possible within the scope of the invention claimed.

What is claimed is:

1. A panel member having a simulated traditional colonial sand-finished masonry appearance, with the characteristic rugged, roughened, unmolded and uncast surface, which surface is extremely hard, water-repellent and permanent but permits diffusion of moisture; said surface being applied to a porous substrate and consisting of a thin, pressure smeared coating of a composition comprising a cured thermosetting ethylenically unsaturated alkyd resin, a cured polymerizable vinyl monomer, and at least 50% by weight of sand as a finely-divided filler; said sand filler being treated with between about 0.01% and 2% by weight of an alkylene substituted silane or siloxane of the formula:

$$R_zSiX_{(4-z)}$$

in which R is an unsaturated group, X is a group which reacts with sand or moisture, and x is a whole number from 1 to 3; and said porous substrate comprising one or more materials selected from the group consisting of cinders, slag, concrete, haydite, clay, sand, sandlime, gasbetone, gravel, and cement.

2. A panel member according to claim 1 wherein the polymerizable vinyl monomer is styrene.

3. A panel member according to claim 1 wherein the alkylene substituted silane is vinyl trichlorosilane.

4. A panel member according to claim 1 wherein said composition also comprises an ultraviolet absorbent.

5. A panel member according to claim 4 wherein the ultraviolet absorbent is a member selected from the class consisting of benzophenones, benzotriazoles, substituted acrylonitriles, and monobenzoates.

6. A panel member according to claim 1 wherein the alkyd resin is made from a glycol and an ethylenically unsaturated dicarboxylic acid.

7. A panel member according to claim 1 wherein the porous substrate is a building block.

8. A panel member according to claim 1 wherein the porous substrate is a concrete panel.

9. A panel member according to claim 1 wherein the sand filler comprises at least about 75% by weight of said surface.

10. A panel member according to claim 1 wherein the vinyl monomer is styrene.

11. A panel member according to claim 1 wherein the alkylene substituted silane is vinyl trichlorosilane.

12. A panel member having a simulated traditional colonial sand-finished masonry appearance, with the characteristic rugged, roughened, unmolded and uncast surface, which surface is extremely hard, water-repellent and permanent but permits diffusion of moisture; said surface being applied to a porous substrate and consisting of a thin, pressure smeared coating of a composition comprising a cured thermosetting ethylenically unsaturated alkyl resin, a cured polymerizable vinyl monomer, and at least 50% by weight of sand as a finely-divided filter; said sand filler being treated with between about 0.01% and 2% by weight of an alkylene substituted silane or siloxane of the formula:

$$R_zSiX_{(4-z)}$$

in which R is an unsaturated group, X is a group which reacts with sand or moisture, and x is a whole number from 1 to 3; said porous substrate comprising one or more materials selected from the group consisting of cinders, slag, concrete, haydite, clay, sand, sandlime, gasbetone, gravel and cement; and said surface being between about one-thirtysecond and one-sixteenth inch in thickness.

13. A method of producing a panel member having a simulated traditional colonial sandfinished masonry appearance, with the characteristic rugged, roughened, unmolded and uncast surface, which surface is extremely hard, water-repellent and permanent but permits diffusion of moisture; said surface being applied to a porous substrate and consisting of a thin, pressure smeared coating of a composition comprising a thermosetting ethylenically unsaturated alkyd resin, a polymerizable vinyl monomer, and at least 50% by weight of sand as a finely-divided filler; said sand filler being treated with between about 0.01% and 2% by weight of an alkylene substituted silane or siloxane of the formula:

$$R_zSiX_{(4-z)}$$

in which R is an unsaturated group, X is a group which reacts with sand or moisture, and $x$ is a whole number from 1 to 3; and said porous substrate comprising one or more materials selected from the group consisting of cinders, slag, concrete, haydite, clay, sand, sandlime, gasbetone, gravel, and cement; which method comprises:

applying said composition to said porous substrate;
troweling or otherwise pressure smearing but not molding or casting said composition on the surface of said substrate; and
curing said composition.

14. A method according to claim 13 wherein the composition is sprayed on said porous substrate and then troweled on said substrate.

15. A method according to claim 14 wherein the components of said composition are separately sprayed and mixed in the course of spraying.

16. A method according to claim 13 wherein the composition is sprayed on said substrate, then troweled and then rolled on said substrate.

17. A method according to claim 13 wherein the curing takes place at an elevated temperature.

18. A method according to claim 13 wherein the curing takes place at ambient temperature.

19. A method according to claim 13 wherein the vinyl monomer is styrene.

20. A method according to claim 13 wherein the alkylene substituted silane is vinyl trichlorosilane.

21. A method according to claim 13 also containing in said composition an ultraviolet absorbent.

22. A method according to claim 21 wherein the ultraviolet absorbent is a member selected from the class consisting of benzophenones, benzotriazoles, substituted acrylonitriles, and monobenzoates.

23. A method according to claim 13 wherein said sand filler comprises at least about 75% by weight of said composition.

24. A method of producing a panel member having a simulated traditional colonial sand-finished masonry appearance, with the characteristic rugged, roughened, unmolded and uncast surface, which surface is extremely hard, water-repellent and permanent but permits diffusion of moisture; said surface being applied to a porous substrate and consisting of a thin, pressure smeared coating of a composition comprising a thermosetting ethylenically unsaturated alkyd resin, a polymerizable vinyl monomer, and at least 50% by weight of sand as a finely-divided filler; said sand filler being treated with between about 0.01% and 2% by weight of an alkylene substituted silane or siloxane of the formula:

$$R_xSiX_{(4-x)}$$

in which R is an unsaturated group, X is a group which reacts with sand or moisture, and x is a whole number from 1 to 3; and said porous substrate comprising one or more materials selected from the group consisting of cinders, slag, concrete, haydite, clay, sand, sandlime, gasbetone, gravel and cement; which method comprises:
  applying said composition to said porous substrate to a thickness of between about one-thirtysecond and one-sixteenth inch;
  troweling or otherwise pressure smearing but not molding or casting said composition on the surface of said substrate; and
  curing said composition.

* * * * *